United States Patent [19]

Cucchi et al.

[11] Patent Number: 4,639,180

[45] Date of Patent: Jan. 27, 1987

[54] EQUIPMENT FOR LOADING BARS TO BE MACHINED ON A DEVICE FOR PRESENTING AND FEEDING SAID BARS TO A MACHINE TOOL

[75] Inventors: Giovanni Cucchi; Pietro Cucchi, both of Bussero, Italy

[73] Assignee: F.LLI Cucchi S.R.L., Bussero, Italy

[21] Appl. No.: 734,043

[22] Filed: May 15, 1985

[30] Foreign Application Priority Data

May 24, 1984 [IT] Italy .................. 21909/84[U]

[51] Int. Cl.⁴ .............................................. B65H 3/00
[52] U.S. Cl. .................................. 414/224; 198/463.5; 198/468.6; 414/748
[58] Field of Search ............ 414/222, 224–226, 414/276, 748, 745; 198/468.6, 468.8, 463.5

[56] References Cited

U.S. PATENT DOCUMENTS

| | | | |
|---|---|---|---|
| 1,766,573 | 6/1930 | Westin | 414/733 |
| 2,835,372 | 5/1958 | Biddison | 198/468.6 X |
| 2,896,796 | 7/1959 | Schuetz | 414/748 |
| 3,062,389 | 11/1962 | Hunter | 414/748 |
| 3,913,751 | 10/1975 | Friedman | 414/748 X |

FOREIGN PATENT DOCUMENTS 818813 4/1981 U.S.S.R. .................. 414/276

Primary Examiner—Leslie J. Paperner
Assistant Examiner—Donald W. Underwood
Attorney, Agent, or Firm—Shlesinger Fitzsimmons Shlesinger

[57] ABSTRACT

A bar lifting equipment in automatic bar loading devices for a machine tool comprises a plurality of arms driven to rotate in a vertical plane parallel to said bars for displacing their end, which end is provided with means for grasping said bars, from a first lower position in which one bar is drawn out a supply source to a second upper position where a rotating comb device is provided. Said comb device being suitable for drawing out said bar and dropping it by gravity onto a channel-shaped jaw, said jaw being suitable for introducing said bar into the machine tool.

4 Claims, 4 Drawing Figures

EQUIPMENT FOR LOADING BARS TO BE MACHINED ON A DEVICE FOR PRESENTING AND FEEDING SAID BARS TO A MACHINE TOOL

Devices for presenting and feeding bars to machine tools, such as multi-spindle lathers, are known.

Said devices include chambers in which a bar drawn usually from a chute carrying a number of ranged bars is to be laid down.

For example, it is known to draw the bars from said chute by means of a plurality of carriage members which lower to load the bar from a platform and lift the bar so as to give said bar to members suitable for entering said bar into its guide, said carriage members coming thereafter down to draw a new bar.

Such devices operating with alternate movements, even though not unsatisfactory from the point of view of the functional result, suffer from several complications from the structural point of view.

The object of this invention is therefore to provide an equipment of the above type which is of an easy and relatively inexpensive construction, yet reliable and functionally quite satisfactory.

To this end, according to the invention there is provided a bar lifting equipment in automatic bar loading devices for a machine tool, characterized in that it is comprised of a plurality of arms driven to rotate in a vertical plane parallel to said bars for displacing their end, which end is provided with means for grasping said bars, from a first lower position in which one bar is drawn out a supply source to an upper position where a rotating comb device is provided, said comb device being suitable for drawing out said bar and dropping it by gravity onto a channel-shaped jaw, said jaw being suitable for introducing said bar into the machine tool.

The structural and operative features of the equipment of this invention and its advantages over the known equipments of this type will become even more apparent upon a reading of the following description and on examination of the accompanying schematic drawings which show an embodiment of the invention.

Figure 1:
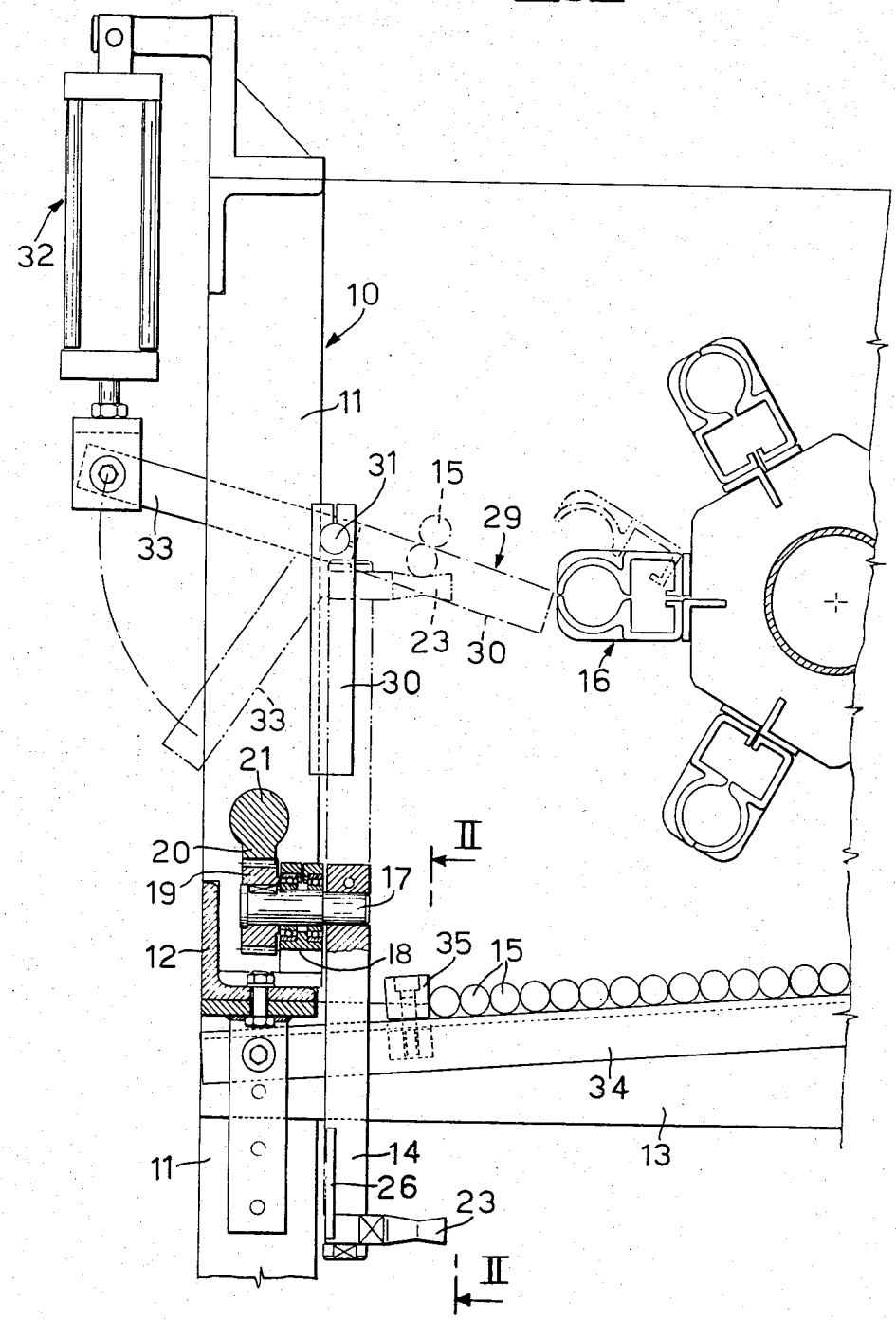
FIG. 1 is an elevation partially sectional view of an equipment according to the present invention.

Referring to the drawings, and first to FIG. 1, an equipment for loading bars according to the present invention is structurally comprised of a supporting frame 10 including posts 11, longitudinal members 12 and cross-pieces 13.

On one side of frame 10 there is provided a plurality of rocking arms 14 which automatically draw the bars 15 out a supply and carry said bars in correspondence with a plurality of channel-shaped jaws 16 arranged in an indexing type configuration. Said jaws feed in a guided fashion each bar 15 to the machine tool, for example a lathe, using an arrangement known per se, and therefore not herein described.

Figure 2:
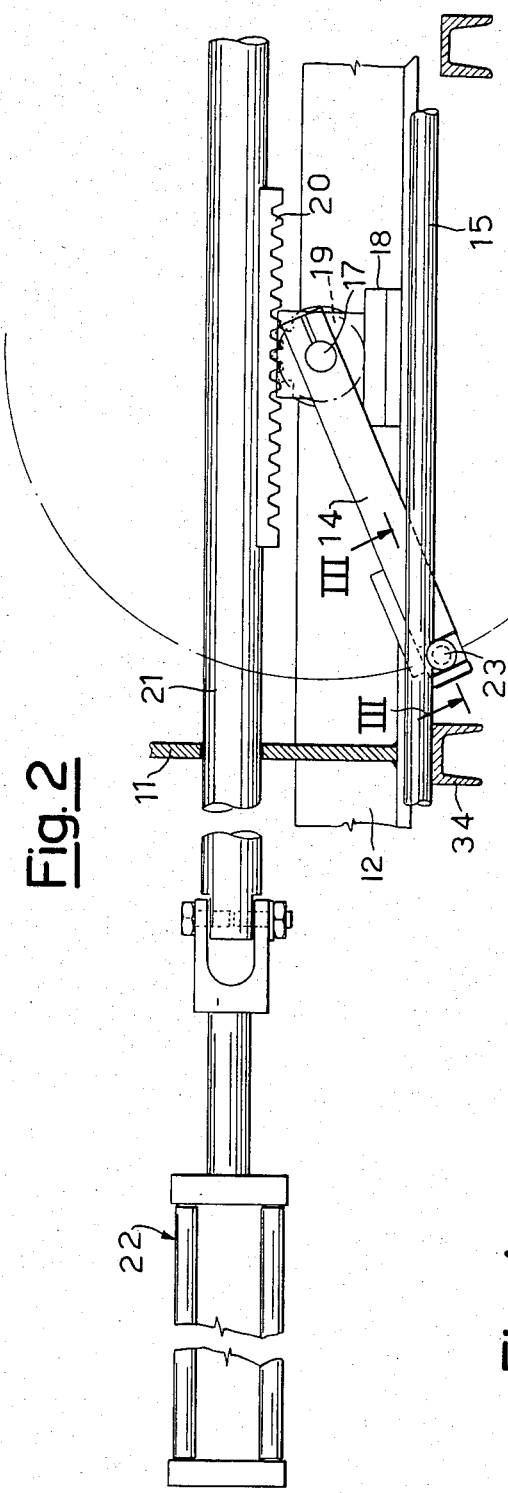
FIG. 2 is a partially sectional view taken along the line II—II of FIG. 1.
Figure 3:
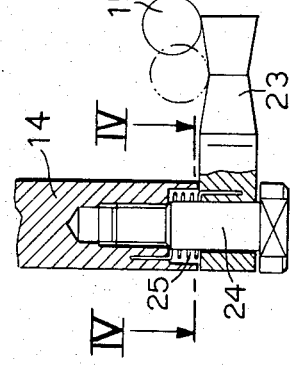
FIG. 3 and FIG. 4 are sectional views taken along the lines III—III and IV—IV, respectively, showing a detail of the equipment of FIG. 1.
Figure 4:
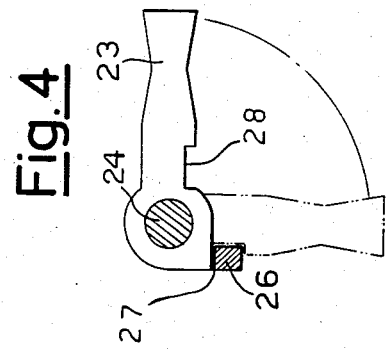

In more detail, each arm 14 is fastened to one end of a pin 17 rotatable on a bearing support 18 fixed to one of the longitudinal members 12. A sector gear 19 keyed to pin 17 at the end thereof opposite to arm 14 is meshing with a rack 20 fastened to a guided actuating stem 21 which is driven in a reciprocating movement by means of an actuator designated generally by the reference numeral 22, for example a hydraulic cylinder (FIG. 2.). Obviously stem 21 is single and is provided with a plurality of mutually spaced racks 20 corresponding exactly to the plurality of arms 14; it is thus formed a perfect actuating synchronism. On the free end of each arm 14 (FIG. 3) there is pivotally connected a dog 23 pivoting on a pin 24 against the action of a spring 25 between two positions shown in FIG. 4 with solid lines and dot-dash lines, respectively. Said limit positions are fixed by a strip 26 fastened to the arm 14 and cooperating with abutment portions 27, 28 of the dog 23, as clearly shown in FIG. 4.

A comb device 29 cooperates with said plurality of arms 14 by drawing out the bar 15 which has been lifted by arms 14 and letting said bar slide within the open jaw 16. In more detail, said comb device 29 is comprised of a plurality of spaced prongs 30 fastened to a shaft 31 driven for rotation by means of an actuator 32 through a connecting rod 33.

The operation of the equipment of the invention can be clearly understood from the above description taken in connection with the drawings, and briefly is as follows.

A plurality of bars 15 can, for example, be fed by gravity in correspondence to the lifting arms 14 by means of a sloping chute or platform provided by a plurality of U-shaped beams 34, preferably said platform having an adjustable slope so as to assure the bar feeding for any size of the bar cross-section.

The free downward movement of the bars is stopped by means of retainer members 35 the position of which is adjustable, so that the first bar 15, and only that bar, becomes placed on the pathway of the dogs 23 of the arms 14. Thus, by causing the arms 14 to rock in the position illustrated by dot-dash lines in FIG. 1, the first bar 15 is withdrawn by the dogs 23 (which are locked in the position illustrated by solid lines in FIG. 4) and lifted up to a height which is slightly higher than the position of an open jaw 16. By driving at this point each comb member 30 into the position illustrated by dot-dash lines in FIG. 1, the bar 15 is drawn out the dogs 23 by means of said comb members and dropped by gravity within the channel-shaped jaw 16. The arms 14 are then driven back to the lower starting position, and meanwhile a new bar 15 has arrived at rest freely against the retainer members 35. Said return movement of the arms 14 is permitted by the rocking movement of the corresponding dogs 23, in the position shown by dot-dash lines in FIG. 4, at the time of the collision with the bar 15 already in position ready for the next operative sequence.

Those skilled in the art will now appreciate that the equipment or mechanism according to the invention fulfils its object. In particular it is worth noting that the kinematic arrangement for synchronously actuating all arms results very simple and of small size, by virtue of the fact that it comprises only the reciprocating bar 21.

The fact that the withdrawing members, i.e. the dogs 23, are carried by rocking arms avoids any complicated problem involved with vertical guides, as well as the corresponding difficulties of adjustment and wear which are characteristic of that type of arrangements.

It is further evident to those skilled in the art that several mechanisms as described can be put vertically in a serial arrangement when the bar is to be lifted at a height more than twice the size deemed convenient for the arms 14. In such a case a first series of arms lift the bar and maintain said bar raised on the dogs. The second series of arms draw the bar out of the dogs, in the same manner as the first series has drawn the bar out the sloping platform, and then lift the bar through a new step, and so on.

Such an arrangement will be advantageous, for example, when closely spaced grasping points for the bar are desired, what correspondingly limits the admissible length for the arms 14.

Many changes can be however made on the above described arrangements, which are described as examples only, in order to adapt the equipment to the specific application.

We claim:

1. A mechanism for lifting bars from a supply of parallel bars in automatic bar loading devices for a machine tool, characterized in that said mechanism comprises a plurality of arms mounted to rotate in a vertical plane parallel to said bars in said supply, means on one end of each of said arms for grasping a bar in said supply, means for driving said arms to displace said grasping means from a first lower position in which one bar is drawn out of said supply and moved by said grasping means to a second upper position, a rotating comb device, and means for rotating said comb device for drawing out said one bar from said grasping means and dropping it by gravity onto a channel-shaped jaw, said jaw being suitable for introducing said bar into the machine tool.

2. A bar lifting mechanism according to claim 1, characterized in that said arms are rockable by said driving means, said grasping means comprises an elastic dog on each arm placed perpendicularly to said arms and suitable for engaging the bars one at a time only during movement thereof from said lower to said upper position, said bars being fed into registry with said dogs through a sloping platform provided with retainer members in registry with said dogs.

3. A bar lifting mechanism according to claim 2, characterized in that said driving means comprises only one actuator connected to each of said arms through a kinematic arrangement comprised of a rack and sector gears.

4. A bar lifting mechanism according to claim 1, characterized in that said comb device is rockable between a non operative position and an operative position, said operative position being operative for drawing the bar out the dogs of said arms when said dogs are in said upper positions.

* * * * *